United States Patent [19]  
Allaire et al.

[11] Patent Number: 4,921,518  
[45] Date of Patent: May 1, 1990

[54] METHOD OF MAKING SHORT FIBER REINFORCED GLASS AND GLASS-CERAMIC MATRIX COMPOSITES

[75] Inventors: Roger A. Allaire; Kishor P. Gadkaree, both of Big Flats, N.Y.

[73] Assignee: Corning Incorporated, Corning, N.Y.

[21] Appl. No.: 288,990

[22] Filed: Dec. 23, 1988

[51] Int. Cl.$^5$ ............................................. C03C 14/00
[52] U.S. Cl. ........................................ 65/18.1; 65/3.3; 65/18.4; 65/60.5; 65/122; 264/122; 428/368; 428/902
[58] Field of Search ................... 65/2, 3.1, 3.2, 3.3, 65/18.1, 18.4, 60.5, 66, 122; 264/109, 122; 428/367, 368, 902

[56] References Cited

U.S. PATENT DOCUMENTS

| | | | |
|---|---|---|---|
| 1,755,953 | 4/1930 | George | 65/66 |
| 2,154,153 | 4/1939 | Easter et al. | 65/66 X |
| 3,351,445 | 11/1967 | Fiedler et al. | 65/3.3 |
| 3,398,004 | 8/1968 | Pendleton et al. | 65/60.5 X |
| 4,412,854 | 11/1983 | Layden | 65/18.1 |
| 4,428,763 | 1/1984 | Layden | 65/18.4 X |
| 4,464,192 | 8/1984 | Layden et al. | 65/3.2 |
| 4,511,663 | 4/1985 | Taylor | 428/367 X |
| 4,541,884 | 9/1985 | Cogswell et al. | 156/166 |
| 4,543,288 | 9/1985 | Radvan et al. | 428/902 |
| 4,554,197 | 11/1985 | Chyung et al. | 428/113 |
| 4,559,262 | 12/1985 | Cogswell et al. | 428/294 |
| 4,636,422 | 1/1987 | Harris et al. | 428/902 |
| 4,717,589 | 1/1988 | Ishikawa et al. | 427/57 |
| 4,752,313 | 6/1988 | Allaire et al. | 65/18.1 |
| 4,764,195 | 8/1988 | Allaire et al. | 65/18.4 |
| 4,780,432 | 10/1988 | Minford et al. | 501/32 |

*Primary Examiner*—Robert L. Lindsay  
*Attorney, Agent, or Firm*—K. van der Sterre

[57] ABSTRACT

A method of making a fiber reinforced glass matrix composite wherein a continuous length of fiber is impregnated with glass and at least partially consolidated to form a fiber-glass matrix system encompassing the continuous length of fibers, cutting the fiber-glass system into a plurality of short fiber reinforced composites, heating the short fiber reinforced composites to form a composite batch wherein the glass matrix is in a molten condition, and molding the composite batch to form a reinforced glass composite article with uniform random distribution of short fibers, is disclosed.

8 Claims, No Drawings

METHOD OF MAKING SHORT FIBER REINFORCED GLASS AND GLASS-CERAMIC MATRIX COMPOSITES

BACKGROUND OF THE INVENTION

This invention relates to a method of forming reinforced glass or glass-ceramic composites, and specifically to the formation of glass or glass-ceramic matrixes reinforced with a plurality of randomly oriented and uniformly distributed short fibers such as chopped fibers and/or whiskers forming an integral part of the composite body. The fibers, although uniformly distributed, are not continuous across the length and width of the body as was typical in the laid-up processes of the prior art.

A fiber-reinforced composite comprises a matrix having reinforcing fibers embedded in and bonded to the matrix. In the past, the composites were formed with reinforcing fibers extending the full length or width of the composite, and articles were produced from such composites by cutting such composites to the desired length and width of the article to be formed and stacking a plurality of such composites on top of one another to provide the necessary height of the desired article, and then hot pressing the layers into a final reinforced article. Such continuous fiber composites, however, were very highly anisotropic in terms of their mechanical properties, due to the orientation of the reinforcing fibers. In addition, it was virtually impossible to produce complex or intricate shaped articles with such continuous fiber reinforced composites. Although a majority of the previous composites utilized organic polymer matrixes, more recently, composites employing glass or glass-ceramic matrixes have been receiving special attention, particularly in view of the high temperature environments which such matrices are adapted.

In the past, the techniques available for forming glass matrix composites have limited articles to shapes that can be uniaxially hot pressed from essentially planar arrays of reinforcing fibers, such as can be produced from aligned fiber tapes, woven fabrics, felts and the like. In U.S. Pat. No. 4,412,854, for example, a method of making fiber reinforced glass composite articles of complex shape is disclosed wherein sheets of woven or non-woven fiber reinforcement are impregnated with a layer of thermoplastic binder containing glass powder to form a "prepreg". The dried sheets are then cut into a plurality of preforms corresponding to the predetermined pattern of the article being fabricated and stacked in a mold and warm molded to form an intermediate article. The intermediate article is then hot pressed to form the final fiber reinforced glass matrix article.

U.S. Pat. No. 4,511,663 discloses the formation of a prepreg body formed of a glass slurry and metal coated fibers. The impregnated body is then cut into pieces and stacked in a mold and hot pressed into a fiber reinforced composite article. In a like manner, U.S. Pat. Nos. 4,554,197 and 4,717,589 disclose the formation of prepreg sheets, the stacking of the sheets in proper contour for the particular shape to be formed and the consolidation into a laminated composite preform, and finally the hot pressing of the preform into a finished shape.

U.S. Pat. Nos. 4,541,884 and 4,559,262 relate to methods of producing fiber-reinforced structures comprising particular thermoplastic polymers, wherein a tow or roving of glass fibers is pulled through a bath of a low viscosity thermosettable resin to impregnate the fibers, and then consolidated by pulling the impregnated roving from the melt through a die in a process known as pultrusion. The prepreg may be chopped into pellets or granules and used in conventional fabrication processes such as injection molding common in the plastics industry.

In order to produce fiber-reinforced glass matrix articles of complex shapes, it is advantageous to provide short or chopped fibers randomly dispersed within the glass matrix. U.S. Pat. No. 4,780,432 discloses an injection molding technique for producing a chopped fiber-reinforced glass product. However this method requires a high-pressure, high-temperature molding step requiring expensive equipment and extensive and possibly damaging fiber realignment in the molding process.

SUMMARY OF THE INVENTION

In its simplest form, the present invention sets forth a new concept in forming composite fiber-reinforced glass matrix articles by first initially forming a plurality of short prepreg fibers and utilizing such fibers in a random orientation within a molding process to produce a glass composite with uniform distribution of fibers and high fiber strength. Preferably, the fibers and a glass matrix are at least partially consolidated when forming the prepreg so that a more conventional type of pressing utilizing molten glass may be employed in the final formation of the composite fiber reinforced glass article.

One method of forming the necessary short fibers is to form fiber reinforced composites by the pultrusion process set forth in U.S. Pat. No. 4,752,313, and cutting the pultruded rod into short lengths as needed for use in a batch material. It has been found that in accordance with the present invention, when the prepreg to be cut into small fibers is formed by the pultrusion procedure, wherein the continuous fiber reinforcement is in the form of a tow which is first combined with a glass material, heated and passed through a die, that the heated glass matrix/fiber system in passing through the die undergoes a softening and redistribution of the glass within the tow to a degree sufficient to at least partially wet or coat the fibers of the tow with the glass, thus resulting in a consolidated or at least partially consolidated composite draw from the die. Accordingly, the hot pressing procedures of the prior art are not required to form a consolidated final product, due to the fact that at least partial consolidation is provided in the pultrusion process. Thus, more conventional pressing techniques or even a transient thermal pressing as disclosed in U.S. Pat. No. 4,764,195 may be utilized to provide a finished uniform completely consolidated fiber-reinforced glass matrix article.

DESCRIPTION OF THE PREFERRED EMBODIMENTS

A suitable fiber-reinforcing material, such as silicon carbide, graphite, alumina, mullite, etc., as known in the reinforcing art, which may be in the form of a plurality of fibers in a tow or a ribbon, is impregnated with a slurry of finely-divided glass or by another glass source as set forth in previously mentioned U.S. Pat. No. 4,752,313, and is drawn through a pultrusion die so as to consolidate the fiber-matrix system and form a consolidated or at least partially consolidated prepreg. The consolidated pultruded rod or prepreg is then cut into short lengths as required for the article to be formed. Depending upon the article to be formed, the consolidated prepreg may be cut into lengths of about ⅛" to several inches.

The short fiber reinforced composites are then heated in the same manner as a traditional glass melt, and after heating and melting the glass matrix, the short fiber and glass composite batch is gathered as a gob and loaded into a matched die set similar to that used in normal glass molding, including a ring, mold and plunger. While the glass composite gob is still hot and the matrix is in a semi-molten state with the short fibers suspended therein, the gob is pressed into a composite article. The glass composite gob flows within the mold or die cavity to fill the cavity and form the desired shape.

In view of the fact that the composite gob matrix is in a molten state and the glass matrix has been consolidated about the various short fibers, it is possible to utilize the more conventional press-forming techniques, wherein the matrix flows laterally during the pressing operation with the article being cooled during the pressing. When the glass matrix is reinforced with graphite fibers, an inert gas atmosphere is preferably utilized during the melting of such glass, although the actual pressing thereof could be accomplished outside of the traditional inert atmosphere since exposure to air would be extremely brief.

If desired, a previously consolidated glass matrix composite preform of rough shape with known fiber orientation may be reformed by utilizing a process analogous to a metal forging, stamping or coining operation. Thus, it is possible to reform simple shapes into complex precision components of near net shape.

Such a forging operation is significantly different from a normal glass forming process wherein a glass gob of relatively unrelated form is shaped into a final component through glass flow over a large distance in a closed mold. Such an operation requires glass flow at low viscosities, wherein the subsequent forging operation is formed at much higher viscosities. In carrying out such secondary reforming, a consolidated preform which is in near bulk form and sized such that its mass is equal to the mass of the component to be formed, is reheated to soften the matrix glass and then it is forged in a matched die. It is understood that the reheating and forging steps may be repeated one or more times depending upon the degree of preform deformation required to achieve the final part shape.

Where the desired shape is of a uniform cross-section and could be made from a fabric or unidirectional ply layup, rather than short fibers, the reforming of the consolidated preform will more closely resemble a stamping or coining process. Accordingly, the preform will only experience a deformation or bending normal to the preform surface. However, where the desired shape is of a more three-dimensional cross-section, the consolidated preform having chopped fibers and press-formed as set forth herein, will experience a reforming operation resembling that of a forging process. Thus, it is possible to process a near net shape preform so as to flow and shape a relatively complex part with fiber orientation controlled within the component.

As previously mentioned, when forming composite fiber-reinforced glass matrix articles utilizing chopped fibers, one of the major problems is that of obtaining a uniform distribution of the fibers in the matrix, which is essential for reliable composite manufacture. In addition to the previously described process of cutting, melting and pressing a continuous fiber preform formed by pultrusion, other methods are contemplated in providing short or chopped fibers for uniform fiber distribution. Again, the fibers may be of any suitable composition such as silicon carbide, graphite, alumina or graphite, and the glassy matrix may be an aluminosilicate glass or borosilicate glass as set forth in U.S. Pat. No. 4,412,854 or it may be a matrix which can be converted to the crystalline state as also suggested in such patent. An example of a preferred fiber for reinforcing a glass matrix to be molded or forged, is a carbon fiber, whereas a preferred glass matrix material is Code 7740 borosilicate glass.

In carrying out an alternate method, a continuous fiber is first subject to a burnout or heating operation to burnout the sizing, and the fiber is then dipped into an organic slurry containing a binder, a glass powder, thickeners and water. The fiber tow is accordingly impregnated with the glass powder as it passes through the slurry, and the impregnated fiber tow is then dried and may be wound onto a drum for storage and further usage. However, the dried prepreg is then chopped into short fiber lengths of approximately ¼" or as desired. The binder from the slurry is burned out of the chopped prepreg, such as by subjecting the prepreg to a temperature of about 650° C. for approximately 2 hours. The resulting fiber and glass composite is introduced into a carbon mold and hot pressed to form a composite with uniform random distribution of fibers.

Although virtually any slurry composition which will wet and impregnate the fiber tow may be utilized, a representative composition is set forth herebelow:

| Component | Weight in grams |
| --- | --- |
| Glass | 250 |
| Isopropanol | 155 |
| Rhoplex HA-8 | 120 |
| CPE-15 | 9 |
| TAMOL | 5 |
| Water | 462 |

If a hybrid chopped fiber-whisker-glass or glass-ceramic composite is desired, whiskers may be dispersed in the prepreg slurry with the glass powder, and accordingly the fibers will be so impregnated, dried and cut into lengths as previously described. Further, as previously described, the binder is burned out and the whisker-fiber-glass or glass-ceramic mixture is then hot pressed to obtain a composite with uniform distribution of fibers and whiskers.

As an alternative, the continuous fiber of the previous illustration may be first cut into suitable lengths before the sizing is burned out, and then the chopped fibers may be subject to the sizing burnout. After removal of the sizing, the fiber and a glass powder in appropriate proportions, of for example 40% chopped fiber by weight and the remainder glass powder, may be introduced into a blender containing a 75:25 liquid mixture of isopropanol and water, so as to have about 20% solids and 80% liquid, and blended for approximately 5 minutes. After the blending, the slurry may be filtered in a Buchner funnel thus producing a random mixing of glass and fibers. The mixture is then hot pressed, utilizing conventional hot pressing operations to obtain a dense composite. The fiber distribution obtained is uniform and the resulting fiber lengths are much shorter than the initial ¼" fiber, due to fiber breakage during the blending operation.

Although we have disclosed the now preferred embodiments of our invention, it will be apparent to those skilled in the art that various changes and modifications may be made thereto without departing from the spirit and scope thereof as defined in the appended claims.

What is claimed is:

1. A method of making short fiber reinforced glass matrix composites which comprises:
   impregnating a continuous length of fibers with glass;
   at least partially consolidating said length of fibers and the glass by at least partially wetting or coating the fibers with the glass and forming a fiber-glass matrix system encompassing said continuous length of fibers;
   cutting said continuous length fiber reinforced glass matrix into a plurality of short fiber reinforced composites;
   heating said short fiber reinforced composites to form a short fiber and glass matrix composite batch with the matrix in a molten condition having the short fibers suspended therein; and
   molding a gob of said composite molten batch to form a consolidated desired shape fiber reinforced glass composite article with uniform random distribution of short fibers.

2. A method of making short fiber reinforced glass matrix composites as defined in claim 1 including the step of impregnating a continuous length of fiber with a slurry of finely-divided glass particles to form a prepreg.

3. A method of making short fiber reinforced glass matrix composites as defined in claim 2 including the step of drawing said prepreg through a pultrusion die to at least partially consolidate said fibers and glass to form a fiber reinforced glass matrix composite preform.

4. A method of making short fiber reinforced glass matrix composites as defined in claim 1 including the step of impregnating said continuous length of fibers with glass as a plurality of tows, and consolidating such glass about said fibers by drawing such tows through a heated pultrusion die to form a unitary fiber-reinforced glass matrix composite preform.

5. A method of making short fiber reinforced glass matrix composites as defined in claim 1 including the steps of loading a gob of said molten glass matrix and short fiber composite batch into the cavity of a forming mold, and pressing said molten gob so as to flow within said cavity and form the desired shape.

6. A method of making short fiber reinforced glass matrix composites as defined in claim 5 including the steps of pressing said molten gob in a conventional mold, ring and plunger assembly, and cooling such gob as it is being shaped into the desired fiber reinforced glass composite.

7. A method of making short fiber reinforced glass matrix composites as defined in claim 1 including the steps of reheating said molded shape composite to soften the matrix glass and then forging said softened composite in a set of matched dies to reform the molded composite into a complex precision component of net shape.

8. A method of making short fiber reinforced glass matrix composites as defined in claim 1 including the step of heating said consolidated short fiber reinforced composite batch in an inert atmosphere.

* * * * *